United States Patent [19]

Yana et al.

[11] Patent Number: 4,532,524

[45] Date of Patent: Jul. 30, 1985

[54] THERMAL INK-TRANSFER PRINTING APPARATUS

[75] Inventors: Masasumi Yana, Yokohama; Tadayoshi Ohno, Kawasaki, both of Japan

[73] Assignee: Tokyo Shibaura Denki Kabushiki Kaisha, Kawasaki, Japan

[21] Appl. No.: 485,058

[22] Filed: Apr. 14, 1983

[30] Foreign Application Priority Data

Jun. 29, 1982 [JP] Japan ................................ 57-110801

[51] Int. Cl.³ .......................... G01D 15/10; B41J 3/20

[52] U.S. Cl. ................................ 346/76 PH; 400/120

[58] Field of Search .............. 346/76 PH, 46; 400/120

[56] References Cited

U.S. PATENT DOCUMENTS 4,442,460 4/1984 Kurata et al. ........................ 358/296

4,463,360 7/1984 Kinuchi et al. ................ 346/76 PH

FOREIGN PATENT DOCUMENTS 54-133913 10/1979 Japan .............................. 346/76 PH 57-69069 4/1982 Japan .............................. 346/76 PH

*Primary Examiner*—E. A. Goldberg

*Assistant Examiner*—Gerald E. Preston

*Attorney, Agent, or Firm*—Oblon, Fisher, Spivak, McClelland & Maier

[57] ABSTRACT

In a thermal ink-transfer printing apparatus, a recording sheet to which a picture is to be transferred and an ink film having an ink layer are passed between a thermal head and a platen roller so that ink of the ink film is transferred to the recording sheet in accordance with a picture pattern. The thermal head is provided with heating resistors which are arranged in a line and which selectively generate heat in response to picture signals. Thus, the ink of the ink film is selectively heated and softened or melted to be transferred to the recording sheet. The ink film and the recording sheet pass through a gap between the platen roller and the thermal head in such a manner that the ink layer of the ink film is in contact with the recording sheet. In the ink transfer, the platen roller can rotate while pressing the ink film and the recording sheet on the heating resistor array of the thermal head. A restricting roller rolling on the platen roller is disposed upstream of the heating resistor array with respect to the travelling direction of the ink film. The ink film passes through a gap between the restricting roller and the platen roller to be guided in a specific path.

17 Claims, 12 Drawing Figures

THERMAL INK-TRANSFER PRINTING APPARATUS

BACKGROUND OF THE INVENTION

This invention relates to a thermal ink-transfer printing apparatus capable of recording high-quality pictures.

With the rapid spread of information-communicating means, attention has come to focus on recording apparatuses as terminal equipment. A recording apparatus of the conventional impact printer type has been subject to several drawbacks, such as high recording noise, low printing speed, high cost, etc.

A thermal ink-transfer printing apparatus has come to be considered as a recording apparatus to take the place of the impact printer type. In this thermal ink-transfer printing apparatus, an ink film carrying ink which may be softened or melted by heating is joined with a recording sheet, and heat is applied to a predetermined picture region so that the softened or melted ink is transferred to the recording sheet. The printing apparatus of this type has a simple recording principle and a simple configuration. Moreover, the thermal ink-transfer printing apparatus provides satisfactory recording performance, ensuring good preservation and substantially no falsifiability of recorded pictures and producing hardly any recording noise. In the thermal ink-transfer system, however, heat must be applied instantaneously to the ink film for uniform heating of the picture region. Therefore, the quality of the recorded pictures will be reduced unless the thermal ink transfer is performed with high reliability and with high accuracy.

The inventors hereof have proposed a thermal ink-transfer printing apparatus capable of forming polychrome pictures, as shown in FIG. 1. In this printing apparatus, an ink film 2, which is divided along its feeding direction into several regions individually carrying ink layers of a plurality of colors, is fed in one direction, while a recording sheet 4 is moved in that direction and another direction. A thermal head 6 has a heating resistor array whose length is equal to or shorter than the widths of the ink film 2 and the recording sheet 4. Thermal ink transfer is repeated for the individual colors to form a polychrome picture on the recording sheet 4. In this case, the ink film 2 is required to quickly transmit the heat from the heating resistor array of the thermal head 6 to the ink of the ink film 2. Accordingly, the ink film 2 is made extremely thin and so lacks firmness. Moreover, the width of the ink film 2 is quite large, depending on the width of the transfer region. Accordingly, the ink film 2 will readily be wrinkled unless it is fed with high accuracy and in a well-balanced manner. When the wrinkled ink film 2 is clamped between the thermal head 6 and the recording sheet 4, the wrinkles will build up into a fold unless the wrinkles are removed before the film 2 reaches the head 6. As a result, the conditions of thermal transmission will fluctuate to cause defective ink transfer, such as transfer slip, as it is sometimes called. Thus, the quality of recorded pictures will be deteriorated. Although the method of winding the ink film 2 was improved for uniform transverse winding, it proved impossible to prevent the ink film 2 from being wrinkled.

SUMMARY OF THE INVENTION

An object of this invention is to provide a thermal ink-transfer printing apparatus capable of preventing an ink film from being wrinkled by thermal contraction caused by heat from the recording means.

Another object of the invention is to provide a thermal ink-transfer printing apparatus which is free from variation of the separating point at which a recording sheet is separated from an ink carrier after ink is heated.

Still another object of the invention is to provide a thermal ink-transfer printing apparatus in which an ink film and a recording medium overlapping each other are pressed against a heating element array of recording means by a platen roller.

A further object of the invention is to provide a thermal ink-transfer printing apparatus capable of using a thin ink film.

According to this invention, there is provided a thermal ink-transfer printing apparatus which comprises recording means including a plurality of heating element, such as heating resistors, arranged in a line and selectively generating heat in response to picture signals, and supporting means for supporting the recording means. The thermal ink-transfer printing apparatus further comprises a rotatable platen roller with its axis parallel with the extending direction of the array of the heating elements, and in which one of the platen roller and the supporting means is urged to the other so that the peripheral surface of the platen roller may come into contact with the heating elements of the recording means. An ink film having an ink layer overlapps a recording medium so that the ink layer is in contact with the recording medium, and passes through a gap between the platen roller and the recording means. The ink film moves along the circumference of the platen roller as the platen roller rotates, so that the ink layer is selectively heated by the heat from the heating elements to transfer ink thereon to the recording medium. Ink film guide means is disposed upstream of the recording means with respect to the travelling direction of the ink film. The ink film guide means prevents the ink film from being folded transversely, for example, due to thermal contraction caused by the heat from the heating elements.

According to the results of an analysis made by the inventors of the present invention, the source of the ink film wrinkling may be regarded as follows. The ink film is locally heated by the heating resistors of the thermal head in the picture region. Subjected to this heat, the ink film suffers local uneven thermal contraction. The ink film is normally subjected to tension in its travelling direction by a conveyor system. However, the ink film is not restricted in its movement in the transverse direction (normal to the travelling direction). In addition, it lacks firmness. Therefore, the ink film is susceptible to thermal contraction in the transverse direction. If continuously heated, the ink film will undergo repeated transverse thermal contraction, and will suffer local indentations. The indentations are accumulated in that portion of the ink film 2 which is on the upper-course side of the thermal head 6 with respect to the travelling direction of the ink film. Ultimately, the ink film 2 is wrinkled in the unrestricted transverse direction on the uppercourse side of a pressure contact line 8 which is formed by the thermal head 6 pressed against the ink film 2, as shown in FIG. 2. The wrinkle is crushed on the pressure contact line 8, and the ink film 2 is folded locally. Since the ink film is trebled at the folded portion, the heat from the thermal head cannot readily be transmitted to the ink contacting the recording sheet.

Consequently, defective ink transfer (such as transfer slip) may be caused at the wrinkled portion. Likewise, deep indentations may be created by thermal contraction at that portion of the ink film 2 which is on the delivery side of the thermal head 6. As a result, the ink film is subjected to uneven separating forces when it is separated from the recording sheet. Thus, the ink fails to be separated uniformly, resulting in defective ink transfer.

According to this invention, the indentations of the ink film are removed before the ink film is pressed against the thermal head, so that indentations of the ink film caused by thermal contraction may be prevented from developing into wrinkles.

DETAILED DESCRIPTION OF THE PREFERRED EMBODIMENTS

Figure 1:
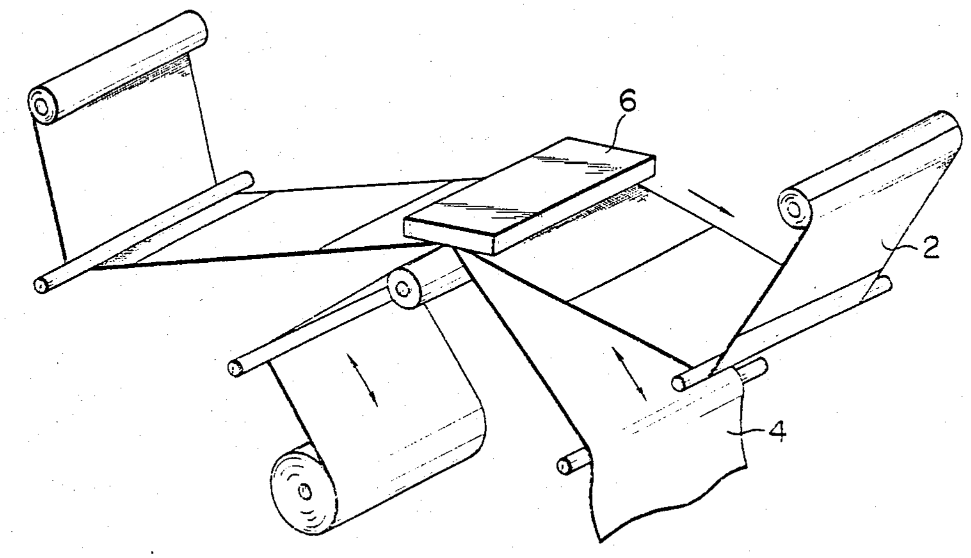
FIG. 1 PRIOR ART
FIG. 1 is a schematic perspective view of a prior art thermal ink-transfer printing apparatus.
Figure 2:
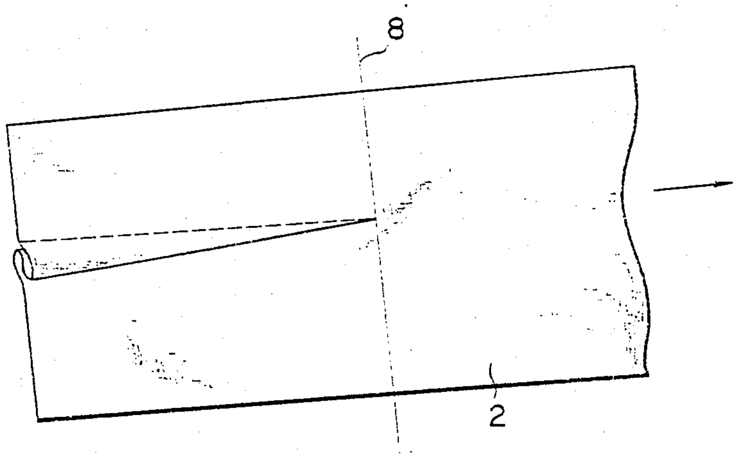
FIG. 2 PRIOR ART
FIG. 2 is a plan view for illustrating the wrinkling process of an ink carrier.
Figure 3:
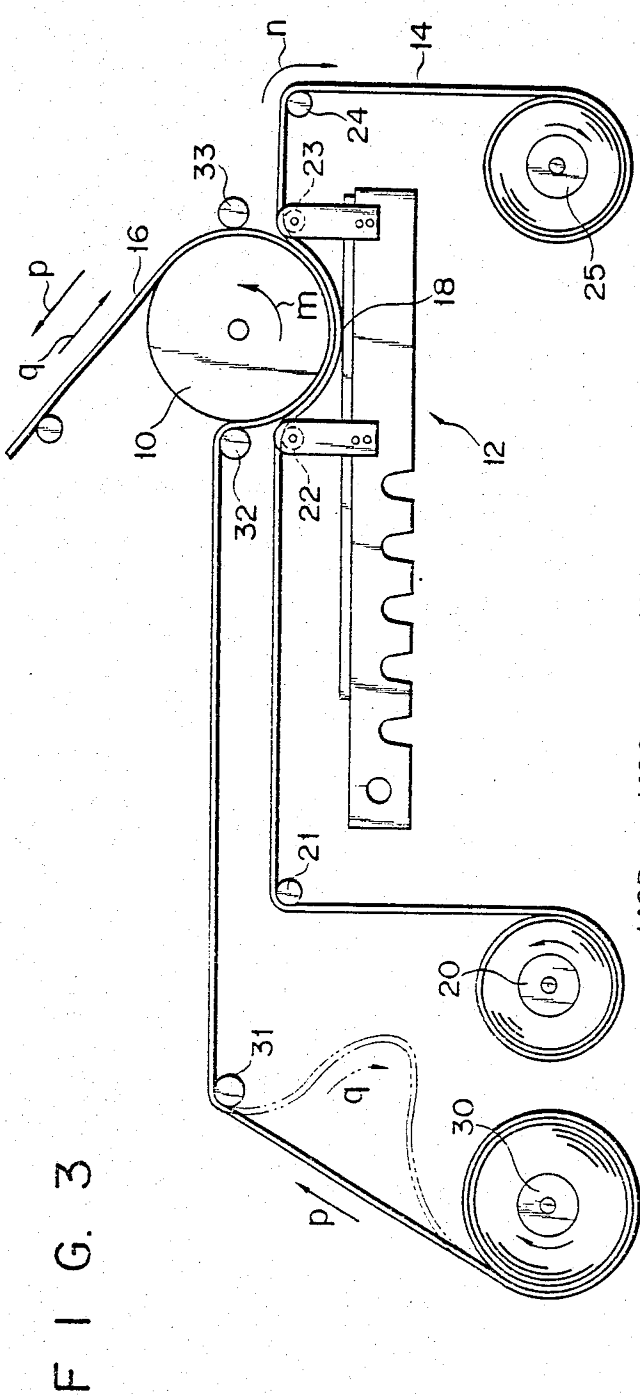
FIG. 3 is a schematic view of a thermal ink-transfer printing apparatus according to a first embodiment of this invention.
Figure 4:
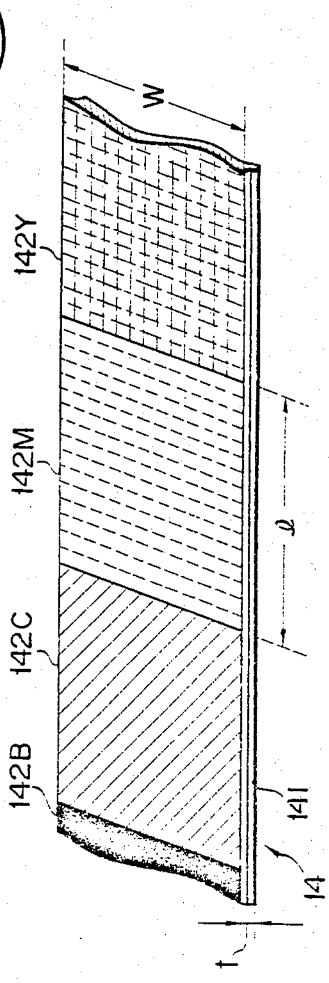
FIG. 4 is a schematic view of an ink carrier.
Figure 5:
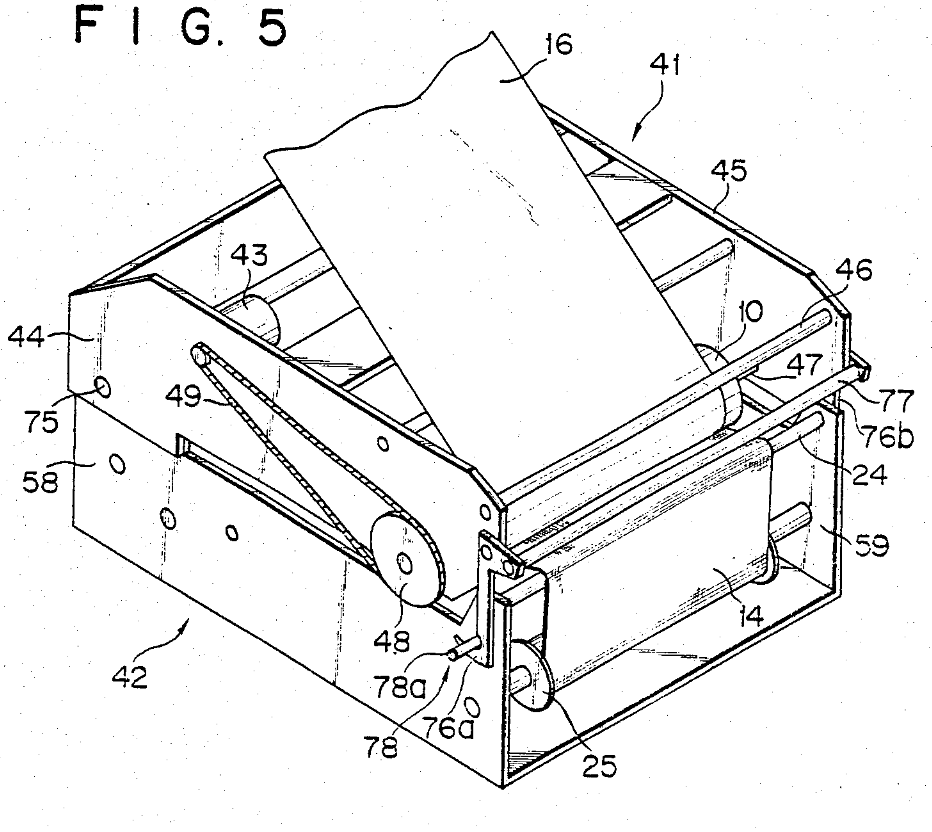
FIG. 5 is a perspective view of the apparatus of FIG. 3.

FIGS. 3 to 10 show a thermal ink-transfer printing apparatus according to a first embodiment of this invention. This thermal ink-transfer printing apparatus is of a type which can form a polychrome picture. FIG. 3 shows a state in which ink is thermally transferred to a recording sheet 16 by a thermal head. Heating resistors, or heating elements, are arranged in a line on a thermal head assembly 12 which functions as a thermal head supporting means, thus forming a heating resistor array 18. A platen roller 10 is disposed so that its longitudinal direction is in alignment with the arrangement direction of the elements of the heating resistor array 18. The platen roller 10 is rotated in the direction of an arrow m by a step motor 43 (FIG. 5). The thermal head assembly 12 is elastically held against the platen roller 10 so that they are in contact at the region of the heating resistor array 18.

The recording sheet 16 is let out from a recording sheet supply roller 30, and is delivered to the platen roller 10, guided by a guide 31. Pinch rollers 32 and 33 are disposed so as to be pressed toward the platen roller 10 on both sides thereof. The recording sheet 16 is led out of the apparatus after it is wound around the platen roller 10 with the aid of the pinch rollers 32 and 33. Thus, the recording sheet 16 is pressed against the peripheral surface of the platen roller 10 by the pinch rollers 32 and 33, and is fed in the direction of an arrow p in FIG. 3 as the platen roller 10 rotates. The recording sheet 16 is returned in the direction of an arrow q, (as represented by two-dot chain line in FIG. 3) by reversing the platen roller 10 after the platen roller 10 and the thermal head assembly 12 are separated.

An ink film 14 as an ink carrier is let out from an ink film supply roller 20. Guided by guides 21 and 24, the ink film 14 is passed between the platen roller 10 and the thermal head assembly 12. After passing between the thermal head assembly 12 and the recording sheet 16 on the platen roller 10 in the direction of an arrow n, the ink film 14 is wound around an ink film take-up roller 25. The take-up roller 25 is coupled with a step motor (not shown) to be rotated thereby in the direction indicated by the arrow in FIG. 3. As shown in FIG. 4, the ink film 14 has a base layer 141 which is formed of, e.g., a condenser paper or a polyester film with a width W of 220 mm and a thickness t of 6 to 12 μm. Formed end to end on the base layer 141 are, for example, yellow, magenta, cyan, and black ink layers 142Y, 142M, 142C and 142B each having a length l. The length l, which may vary with the size of the recording region, is adjusted to approximately 300 mm which is a little greater than the length of A4 paper (210×295 mm) if the recording region is A4 size.

Under the pinch rollers 32 and 33, on both sides of the platen roller 10, restricting roller 22 and pressure roller 23, respectively, are disposed so as to roll on the peripheral surface of the platen roller 10. The restricting roller 22 and pressure roller 23 extend parallel to the platen roller 10. All these rollers have the same length. The ink film 14 is guided by the guides 21 and 24 to the platen roller 10 and the thermal head assembly 12, and is wound around the platen roller 10 with the aid of the rollers 22 and 23. The platen roller 10 is formed by covering a rotating shaft 47 (FIG. 7) with rubber. The hardness of the rubber should preferably be 25 to 40 degrees (JIS hardness).

Figure 6:
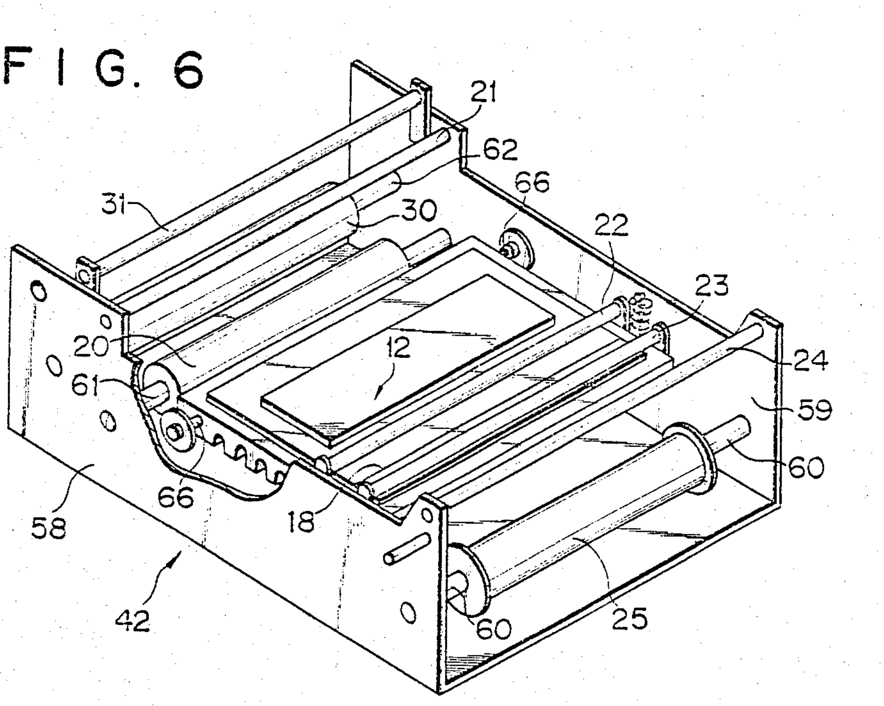
FIG. 6 is a disassembled perspective view of the apparatus.

The construction of the members arranged in this manner will now be described in detail. As shown in FIGS. 5 and 6, the thermal ink-transfer printing apparatus may be divided into halves, i.e., upper and lower housings 41 and 42. The upper housing 41 is mainly mounted with the platen roller 10 and the step motor 43 for driving the platen roller 10, while the lower housing 42 is chiefly mounted with the ink film supply roller 20, the recording sheet supply roller 30, the thermal head assembly 12, the rollers 22 and 23, and the take-up roller 25.

The upper housing 41 has left- and right-hand side plates 44 and 45 which are coupled by means of a bar 46 stretched between them. The shaft 47 of the platen roller 10 is supported by the side plates 44 and 45. The left-hand end portion of the rotating shaft 47 projects outward through the left-hand side plate 44. A sprocket 48 is fitted on the projected portion of the rotating shaft 47. The step motor 43 is mounted on the side plate 44 so that its rotating shaft penetrates the side plate 44 and projects outward. At toothed belt 49 is stretched between the rotating shaft of the step motor 43 and the sprocket 48. Thus, the platen roller 10 is intermittently driven by the step motor 43. The line density in the feeding direction of the recording sheet 16 is 8 lines/mm. Accordingly, if the step motor 43 feeds the recording sheet 16 in two steps for each line, the displacement of the recording sheet 16 moved by the step motor 43 is 1/16 mm for each step. If the feeding speed of the recording sheet 16 is 10 ms/line, then the step interval is 200 Hz.

Figure 7:
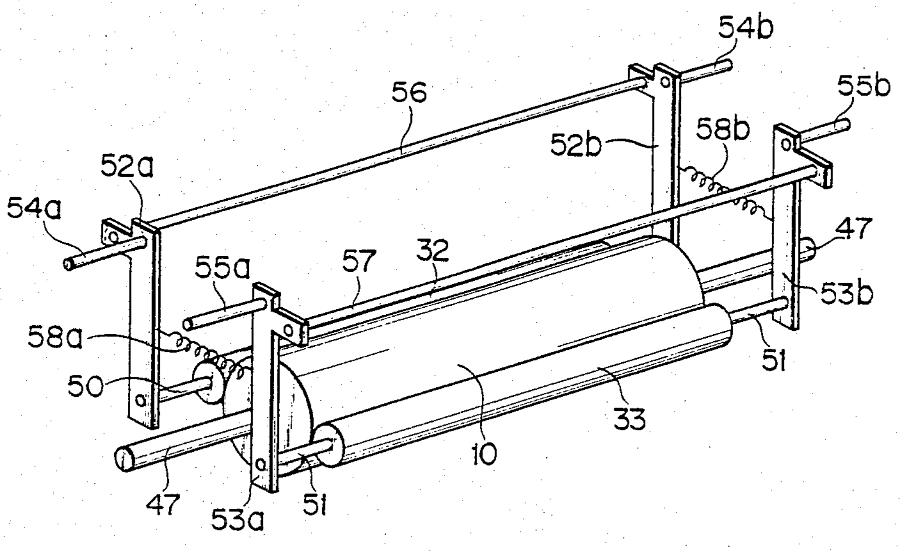
FIG. 7 is a perspective view showing a platen roller and other members adjacent thereto.
Figure 8:
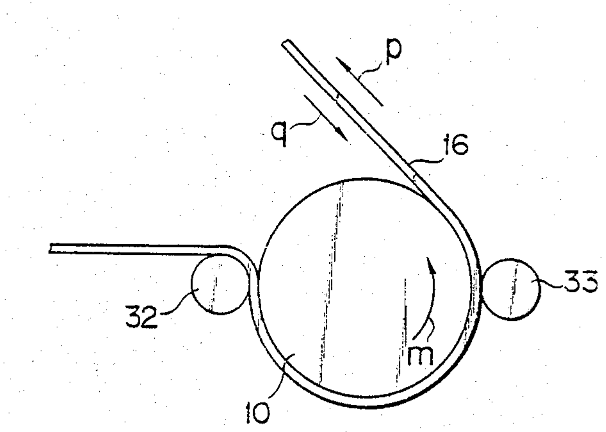
FIG. 8 is a side view of the platen roller.

As shown in FIGS. 3 and 7, the pair of pinch rollers 32 and 33 are disposed on both lateral sides of the platen roller 10 so as to roll on its peripheral surface. A mounting shaft 50 of the pinch roller 32 is rotatably supported at both ends by the respective lower end portions of fixtures 52*a* and 52*b* each in the form of an L-shaped metal strip. Rotating shafts 54*a* and 54*b* are fixed to the upper end portions of the fixtures 52*a* and 52*b*, respectively, and are rotatably supported by the side plates 44 and 45, respectively. A coupling rod 56 is fixed to the fixtures 52*a* and 52*b* to connect the same. A mounting shaft 51 of the pinch roller 33 is rotatably supported at both ends by the respective lower end portions of L-shaped fixtures 53*a* and 53*b*. Rotating shafts 55*a* and 55*b* are fixed to the upper end portions of the fixtures 53*a* and 53*b* respectively, and are rotatably supported by the side plates 44 and 45, respectively. A coupling rod 57 is fixed to the fixtures 53*a* and 53*b* to connect the same. Springs 58*a* and 58*b* are stretched between the fixtures 52*a* and 53*a* and between the fixtures 52*b* and 53*b*, respectively, to urge each pair of fixtures to approach each other. Using the elasticity of the springs 58*a* and 58*b*, the pinch rollers 32 and 33 hold the platen roller 10 under a suitable pressure, and rotate together with the platen roller 10. As shown in FIG. 8, the recording sheet 16 is led between the pinch rollers 32, 33 and the platen roller 10 so as to be wound around the platen roller 10. Further, the recording sheet 16 is pressed toward the platen roller 10 by the pinch rollers 32 and 33. Thus, the recording sheet 16, closely in contact with the peripheral surface of the platen roller 10, is moved in the direction of arrow p or q as the platen roller 10 rotates.

Figure 9:
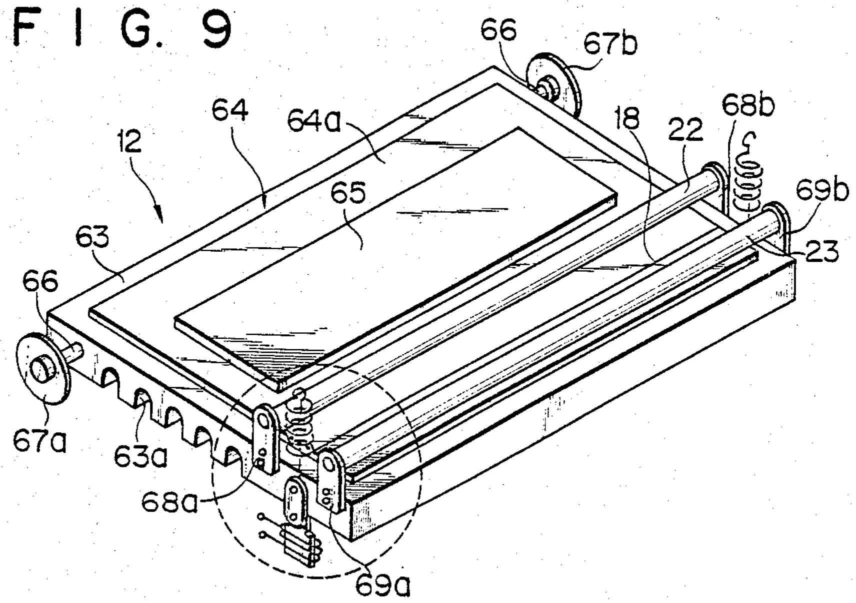
FIG. 9 is a perspective view showing a thermal head assembly and other members adjacent thereto.

Like the upper housing 41, the lower housing 42 has left- and right-hand side plates 58 and 59. A rotating shaft 60 of the ink film take-up roller 25 is supported by the front end portions of the side plates 58 and 59. A rotating shaft 61 of the ink film supply roller 20 is supported by the rear end portions of the side plates 58 and 59. The ink film guide 21 is rotatably supported by the side plates 58 and 59 over the position where the ink film 14 is delivered from the supply roller 20. The ink film guide 24 is rotatably supported by the side plates 58 and 59 at the position which lies over the winding position of the take-up roller 25 and faces the guide 21 in a substantially horizontal fashion. The recording sheet supply roller 30 is disposed over the supply roller 20 so that its rotating shaft 62 is rotatably supported by the side plates 58 and 59. The recording sheet guide 31 is rotatably supported by the side plates 58 and 59 at the position over the supply roller 30 and the guide 21. As shown in FIG. 9, the thermal head assembly 12 mainly comprises a thermal head supporting plate 63 with cooling fins 63*a* at the bottom and a thermal head 64 laid on the top of the supporting plate 63. The thermal head 64 includes the heating resistor array 18 transversely extending at the front end portion of a ceramic plate 64*a* and an IC package 65 laid on that portion of the ceramic plate 64*a* which does not bear the heating resistor array 18. The heating resistor array 18 includes heating resistors which are arranged on the ceramic plate 64*a* with an element density of 8 or 12 elements/mm and an array length of 215 mm corresponding to the width of the ceramic plate 64*a*. The heating resistor array 18 is driven by a driving circuit contained in the IC package 65. A rotating shaft 66 of the thermal head assembly 12 is fixed to the rear end portion of the supporting plate 63 so that its longitudinal direction is in alignment with the transverse direction of the apparatus. Supporting members 67*a* and 67*b* are fitted individually on both ends of the rotating shaft 66 with the aid of bearings (not shown), and are also fixed to the side plates 58 and 59, respectively. Thus, the thermal head assembly 12 can rock with high accuracy around the rotating shaft 66 through the medium of the bearings of the supporting members 67*a* and 67*b*. Two pairs of mounting strips 68*a*, 68*b* and 69*a*, 69*b* are fixed individually to those portions of the both side faces of the supporting plate 63 which are at substantially equal distances from the heating resistor array 18 in the longitudinal direction of the apparatus, projecting upward from the supporting plate 63. The rollers 22 and 23 are rotatably supported by the upper ends of two pairs of mounting strips 68*a*, 68*b* and 69*a*, 69*b*, respectively. The mounting height of the rollers 22 and 23 and the distance between them are so set that the platen roller 10 can bring the ink film 14 thereon into sliding contact with the heating resistor array 18 of the thermal head assembly 12 while engaging the rollers 22 and 23, as shown in FIG. 3. The relative positions of the rollers 22 and 23, the platen roller 10, and the heating resistor array 18 are preferably determined as follows. The roller 22 is softly in contact with or at a narrow distance from the platen roller 10 to support the ink film 14, which is very thin, so that it can be wound around the peripheral surface of the platen roller 10. The pressure roller 23 presses the ink film 14 and the recording sheet 16 up to the platen roller 10 to fix a separating point between the ink film 14 and the recording sheet 16. The platen roller 10 and the heating resistor array 18 hold the ink film 14 and the recording sheet 16 between them for better thermal transfer to the ink.

Figure 10:
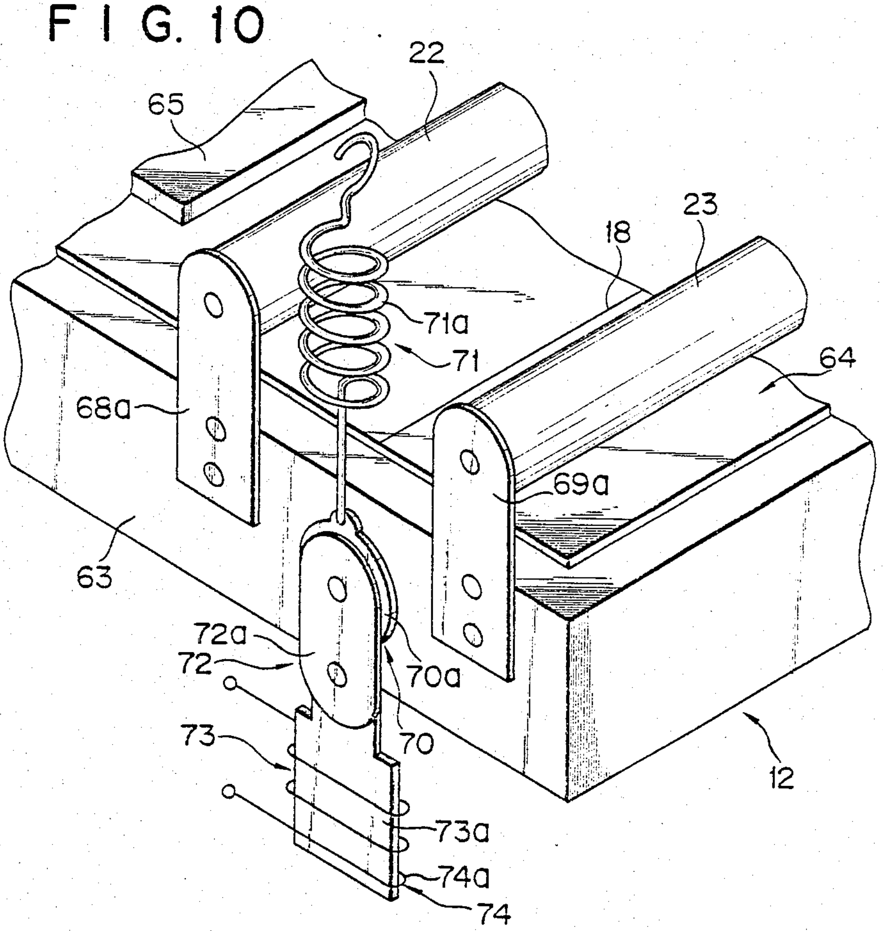
FIG. 10 is an enlarged perspective view showing part of FIG. 9.

As shown in FIG. 10, a pair of fixtures 70 (only a left-hand fixture 70*a* is actually illustrated) are individually fixed to opposite positions at the front end portions of both side faces of the supporting plate 63. A pair of tension springs 71 (only a left-hand spring 71*a* is shown in FIG. 10) are stretched between the fixture 70*a* and the left-hand side plate 58 and between the other fixture and the right-hand side plate 59, respectively. Thus, by the elasticity of these springs 71, the thermal head assembly 12 is urged to rock upward around the rotating shaft 66. Below the supporting plate 63, the fixtures 70 are coupled individually with a pair of cores 73 (only one core 73*a* is shown) by means of coupling strips 72 (only one coupling strip 72*a* is shown). The cores 73 are fitted in their corresponding coils 74 (only one coil 74*a* is shown) of electromagnets. When the coils 74 are energized, the electromagnets drive the cores 73 downward to rock the thermal head assembly 12 downward around the rotating shaft 66. In thermal ink-transfer printing, therefore, the electromagnets are turned off to cause the thermal head assembly 12 to be urged upward by the springs 71 so that the rollers 22 and 23 press the platen roller 10. After the printing is finished, the electromagnets are turned on to rock the thermal head assembly 12 downward against the tensile force of the springs. Thus, the rollers 22 and 23 withdraw downward from the platen roller 10 to allow the recording sheet 16 and the ink film 14 to run freely.

As shown in FIG. 5, the side plates 44 and 45 of the upper housing 41 and the side plates 58 and 59 of the lower housing 42 are rockably coupled at the rear end portion of the apparatus by means of bearings 75. Thus, if the front end portion of the upper housing 41 is lifted, the upper housing 41 rocks backward around the bearings 75 to expose the interior of the apparatus. The upper end portions of a pair of hooks 76a and 76b each having a beaked portion at the lower end are rockably attached to the side plates 44 and 45, respectively. Both ends of a bar 77 are fixed individually to top protruding portions of the hooks 76a and 76b so that the hooks 76a and 76b rotate together through the medium of the bar 77. Retaining projections 78 (only one retaining projection 78a is illustrated in FIG. 5) are attached to those portions of the side plates 58 and 59 which correspond to the positions of the bottom beaked portions of the hooks 76a and 76b. Accordingly, if the beaked portions of the hooks 76a and 76b engage the retaining projections 78, the upper and lower housings 41 and 42 are coupled together to be ready for thermal ink-transfer printing. If the hooks 76a and 76b are rocked and disengaged from the projections 78 by raising the bar 77 with the fingers, the upper and lower housings 41 and 42 are separated to allow for the setting of the recording sheet 16 or other preliminary arrangement.

In operation, the hooks 76a and 76b are disengaged from the projections 78, and the upper housing 41 is rocked upward around the bearings 75. Then, the ink film 14 is drawn out from the ink film supply roller 20, passed around the guides 21 and 24, and wound around the take-up roller 25. The recording sheet 16 drawn out from the recording sheet supply roller 30 is passed around the guide 31, and then passed between the pinch rollers 32, 33 and the platen roller 10. Then, the recording sheet 16 is led out of the apparatus after it is wound around the platen roller 10 with the aid of the pinch rollers 32 and 33. Subsequently, the upper housing 41 is rocked and laid on the lower housing 42, and the hooks 76a and 76b are caused to engage the retaining projections 78, thereby coupling the upper and lower housings 41 and 42 together. Thereupon, the platen roller 10 with the recording sheet 16 thereon presses the ink film 14 against the rollers 22, 23 and the thermal head assembly 12. As a result, the ink film 14 and the recording sheet 16 are brought into close contact with each other, and also with the heating resistor array 18 of the thermal head assembly 12. Thus, the apparatus is ready for the thermal ink-transfer printing.

The thermal ink-transfer printing operation is performed as follows. The platen roller 10 is intermittently rotated in the advancing direction (arrow m of FIG. 3) by the step motor 43. Since the thermal head assembly 12 and the rollers 22 and 23 are urged toward the platen roller 10 by the tension springs 71, the ink film 14 and the recording sheet 16 are pressed against the platen roller 10 by the rollers 22 and 23. Closely in contact with each other, the ink film 14 and the recording sheet 16 advance intermittently as the platen roller 10 rotates. The ink film 14 and the recording sheet 16 are pressed against the thermal head assembly 12 by the platen roller 10, and are selectively heated by the heating resistors of the heating resistor array 18 of the thermal head assembly 12 driven by the IC package 65. Hereupon, the yellow ink, for example, applied to the ink film 14 is selectively softened and melted to form a yellow ink picture on the recording sheet 16. While the ink film 14 and the recording sheet 16 are running in contact, the ink film 14 should preferably be cooled by suitable blast means. The cooling improves the efficiency of ink transfer from the ink film 14 to the recording sheet 16. After the yellow ink picture is formed on the recording sheet 16 by the ink layer 142Y in this manner, the coils 74 are energized to rock the thermal head assembly 12 around the rotating shaft 66, thereby separating the thermal head assembly 12 from the platen roller 10. In this state, the recording sheet 16 is rewound in the direction of arrow q for a length corresponding to the length of a picture as the step motor 43 rotates in reverse. The reversed recording sheet 16 is slackened, as indicated by two-dot chain line in FIG. 3. Then, power to the coils 74 is cut off, so that the thermal head assembly 12 is again pressed against the platen roller 10 by the tension springs 82. The ink film 14 and the recording sheet 16 are again brought into closely contact with each other, and are advanced in the directions of arrows n and p, respectively, as the platen roller 10 rotates intermittently. While the ink film 14 and the recording sheet 16 advance, the magenta ink layer 142M of the ink film 14 is selectively heated by the heating registors of the heating resistor array 18 of the thermal head assembly 12 to form a magenta ink picture on the yellow ink picture on the recording sheet 16. In a similar manner, a cyan ink picture and a black ink picture are formed in layers on the recording sheet 16. Thus, a polychrome picture is formed on the recording sheet 16, and color printing is completed.

While moving together with the recording sheet 16 in the direction of arrow n, the ink film 14 is pressed across its full width against the platen roller 10 by the rollers 22 and 23. Accordingly, the ink film 14 is closely in contact with the peripheral surface of the platen roller 10 when it moves to the front of the apparatus as the platen roller 10 rotates. Thus, the ink film 14 is restricted in deviation relative to the peripheral surface of the platen roller 10 in the transverse direction as well as in the feeding direction. Even if the ink film 14 suffers local thermal contraction caused by heat from the heating resistor array 18, therefore, the thermal contraction will never develop wrinkles. Accordingly, the ink film 14 wil never be folded when it passes the position where it is to be in sliding contact with the thermal head assembly 12, so that the heat from the heating resistor array 18 of the thermal head assembly 12 will be uniformly transmitted to the ink. Thus, defective ink transfer can be avoided. The ink film 14 is prevented from wrinkling, since it is so controlled by the rollers 22 and 23 as to trace the configuration of the peripheral surface of the platen roller 10 when the ink film 14 comes into sliding contact with the heating resistor array 18. The platen roller 10 may be made using silicone rubber with a rubber hardness of 50 degrees (JIS hardness). In this case, the contact pressure between the platen roller 10 and the thermal head assembly 12 may be adjusted to 200 to 250 g/cm with respect to the transverse direction of the platen roller 10. Under this pressure condition, the peripheral surface of the platen roller 10 is distorted at its sliding contact position by the pressure from the thermal head assembly 12, and the ink film 14 and the recording sheet 16 are held between the platen roller 10 and the thermal head assembly 12 with a nip width of 2 to 3 mm. By the use of such a great nip width, the ink film 14 is further prevented from wrinkling.

For satisfactory resolution, the thickness of the ink film 14 should preferably be a tenth or less of the arrangement pitch of the heating resistors of the thermal head assembly 12. Since the heat from the thermal head assembly 12 diverges as it is transmitted in the direction perpendicular to the ink film 14, the recorded picture obtained will be blurred if the ink film 14 is too thick. If the element density of the heating resistors is 8 elements/mm, then the arrangement pitch is 125 μm. In this case, the thickness of the ink film 14 should preferably be 25 μm or less. If the element density of the heating resistors is 12 elements/mm, then the thickness of the ink film 14 needs to be approximately 16 μm or less. That is, the use of a thin ink film is essential to the production of distinct pictures. It may be possible to manufacture such a thin film. If the ink film 14 is thin, however, it is liable to be wrinkled by thermal contraction, and cannot readily be made taut at feeding. The former drawback can be obviated by pressing the ink film 14 between the roller 22 and the platen roller 10 before it comes into contact with the heating resistor array 18, as mentioned before. The latter problem can be settled by bringing the recording sheet 16 and the ink film 14 into close contact with the platen roller 10 with the aid of the pinch rollers 32, 33 and the rollers 22 and 23 so that the recording sheet 16 is fed as the platen roller 10 rotates, and that the ink film 14 is fed as the platen roller 10 and the take-up roller 25 rotate. In this way, the feeding of the ink film 14 is achieved chiefly by rotating the platen roller 10, so that the tension applied to the ink film 14 is small. Therefore, even a thin ink film can be fed easily.

The rubber hardness of the platen roller 10 is properly adjusted so that the platen roller 10 may be brought into linear contact with the thermal head assembly 12 with a narrow contact width. If the recording sheet 16 and the ink film 14 are pressed against the thermal head assembly 12 by flat pressing means, plane contact is obtained. Thus, the contact area is smaller in the case where the platen roller 10 is used than in the case where the flat pressing means is used. By the use of the platen roller 10, therefore, the necessary pressure for the heating resistor array 18 may be obtained from a smaller force. Accordingly, the total amount of the force applied to the ink film 14 is small, so that the ink film 14 can be transferred smoothly.

The platen roller 10 is rotated intermittently by the step motor 43. Also, the recording sheet 16 and the ink film 14 run intermittently. The intermittent travel of the recording sheet 16 and the ink film 14 produces vibration, which changes the separating position at which the recording sheet 16 and the ink film 14, having until now been in close contact with each other, are separated. The variation of the separating position changes the ratio between the amount of softened or melted ink attached to the recording sheet 16 and the amount of ink remaining on the ink film 14, thereby deteriorating the picture quality. However, since the pressure roller 23 to press the ink film 14 toward the platen roller 10 is disposed downstream of the heating resistor array 18 with respect to the travelling direction of the ink film 14, the ink film 14 is separated from the recording sheet 16, tracing along the peripheral surface of the pressure roller 23. Thus, the recording sheet 16 and the ink film 14 are separated at a fixed position in the circumferential direction of the platen roller 10, so that the picture quality will never be deteriorated.

Since the ink film 14 and the recording sheet 16 are in close contact while traveling between the heating resistor array 18 and the pressure roller 23, the ink softened or melted by the heat from the heating resistor array 18 is securely transferred to the recording sheet 16.

Figure 11:
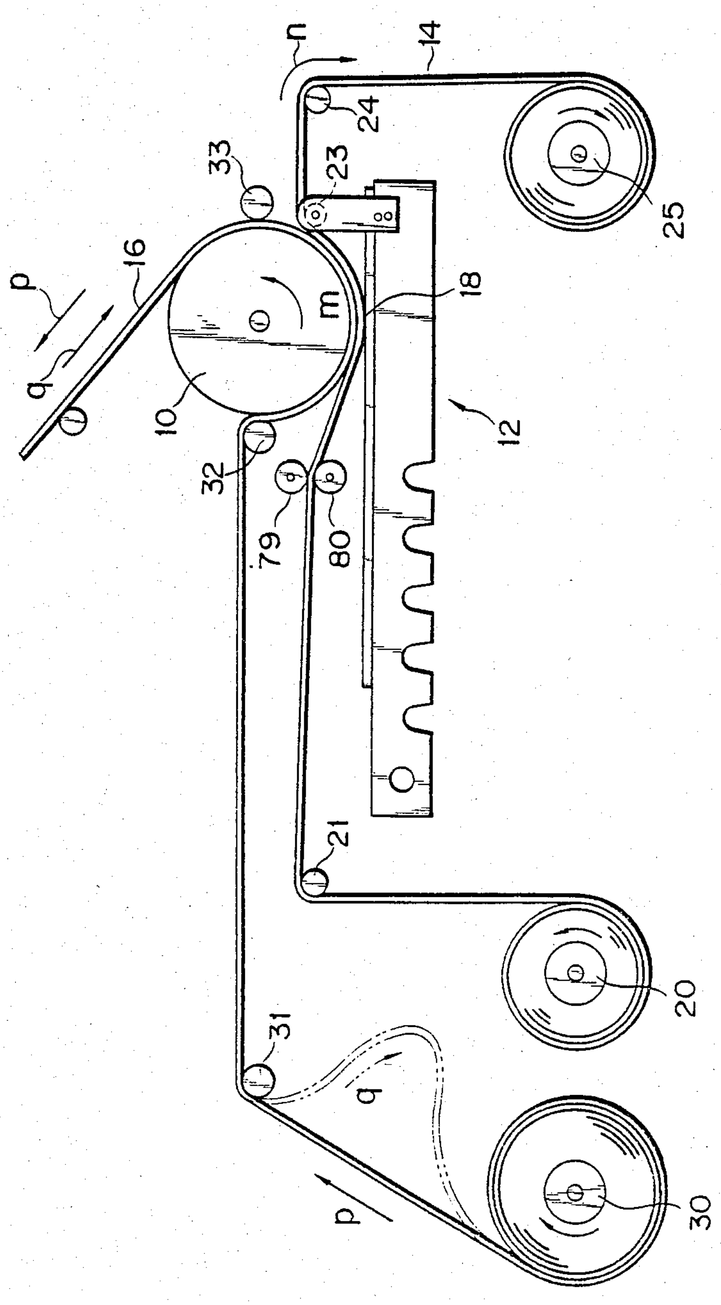
FIG. 11 is a schematic view of a thermal ink-transfer printing apparatus according to a second embodiment of the invention.

The transverse deviation of the ink film 14 may be restricted by passing the ink film 14 between a pair of pinch rollers 79 and 80 which are arranged near the platen roller 10 upstream of the heating resistor array 18 with respect to the travelling direction of the ink film, as shown in FIG. 11, instead of passing the ink film 14 between the roller 22 and the platen roller 10. The pinch rollers 79 and 80 may be attached to the supporting plate 63 of the thermal head assembly 12 or to the side plates 58 and 59 of the lower housing 42, respectively. Likewise, another pair of pinch rollers may be arranged near the platen roller 10 downstream of the heating resistor array 18, in place of the presure roller 23. Moreover, the transverse deviation of the ink film 14 may be restricted by pressing the ink film 14 against the peripheral surface of the platen roller 10 by the use of flat pressing means instead of using the pressure roller 22 or 23. Furthermore, instead of using the restricting roller 22, the cover portion of the IC package 65 on the ceramic plate 64*a* of the thermal head assembly 12 may be swollen near the heating resistor array 18 so that the ink film 14 may be pressed between the cover of the IC package 65 and the platen roller 10 to be restricted in its transverse deviation.

Figure 12:
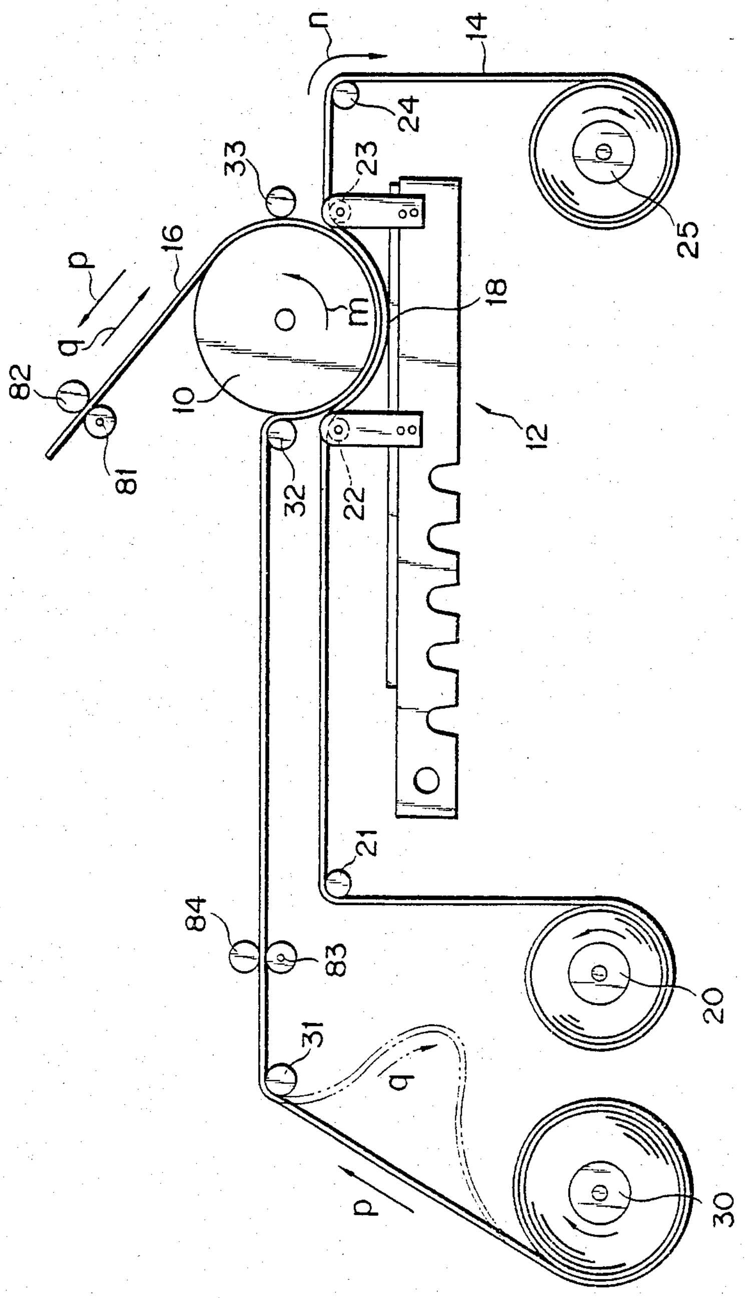
FIG. 12 is a schematic view of a thermal ink-transfer printing apparatus according to a third embodiment of the invention.

This invention may also be applied to a thermal ink-transfer printing apparatus in which the feeding of the recording sheet 16 is controlled by other driving rollers than the platen roller 10, as shown in FIG. 12. The recording sheet 16 is fed by driving rollers 81 and 83 driven by a step motor and rotatable rubber rollers 82 and 84. In feeding the recording sheet 16 in the direction of arrow p, the driving roller 81 and the rubber roller 82 are used for the feed control. In this case, the driving roller 83 and the rubber roller 84 may be allowed to idle or to be driven at a rotating speed a little lower than that of the rollers 81 and 82 so that back tension is applied to the recording sheet 16. In feeding the recording sheet 16 in the direction of arrow q, the driving roller 83 and the rubber roller 84 are used for the feed control. In this case, the driving roller 81 and the rubber roller 82 may be allowed to idle or to be driven at a rotating speed a little lower than that of the rollers 83 and 84 so that back tension is applied to the recording sheet 16. The platen roller 10 is rotatably set so that the recording sheet 16, the ink film 14, and the heating resistor array 18 are in close contact. The ink film 14 is fed as the take-up roller 25 is rotated by the step motor. In this apparatus, the ink film 14 and the recording sheet 16 can be securely fed independently. By the use of the rollers 22 and 23, as shown in FIG. 12, the ink film 14 is restricted in its transverse deviation, and will never be wrinkled during recording. This invention may also be applied to a thermal ink-transfer printing apparatus in which the driving roller 83 and the rubber roller 84 are removed from the arrangement of FIG. 12 so that the recording sheet 16 is fed only in one direction.

This invention is valid without regard to the size of the ink film 14.

What we claim is:

1. A thermal ink-transfer printing apparatus comprising:

recording means including a plurality of heating elements arranged in a line along an extending direction and having means for selectively generating heat in response to picture signals;

supporting means for supporting the recording means;

a rotatable platen roller having an axis parallel with said extending direction;

means for urging one of the platen roller and the supporting means toward the other so that the peripheral surface of the platen roller is urged toward contact with the heating elements of the recording means;

an ink film having an ink layer, the ink film overlapping a recording medium, being positioned for passing through a gap between the platen roller and the recording means and moving along the circumference of the platen roller as the platen roller rotates while contacting said recording medium, so that the ink layer is selectively heated by the heat from the heating elements to transfer ink thereon to the recording medium; and a restricting roller disposed upstream of the recording means with respect to the travelling direction of the ink film and positioned for rolling on the peripheral surface of the platen roller with an axis thereof parallel with said axis of the platen roller, the ink film passing through a gap between the restricting roller and the platen roller to be guided in a specific path, thereby preventing the ink film from being folded transversely due to thermal contraction caused by the heat from the heating elements.

2. The thermal ink-transfer printing apparatus according to claim 1, wherein said recording means includes a thermal head.

3. The thermal ink-transfer printing apparatus according to claim 1 wherein said means for urging comprise a spring urging said supporting means toward the platen roller so that the ink film and the recording medium are held under pressure between the platen roller and the recording means.

4. The thermal ink-transfer printing apparatus according to claim 1, wherein said ink film includes a base layer and an ink layer thereon.

5. The thermal ink-transfer printing apparatus according to claim 1, wherein one of said platen roller and said restricting roller is urged to the other.

6. The thermal ink-transfer printing apparatus according to claim 5, wherein said restricting roller is attached to the supporting means.

7. The thermal ink-transfer printing apparatus according to claim 1, further comprising holding means disposed downstream of the recording means with respect to the travelling direction of the ink film, whereby the ink film is held across its full width under pressure in the direction of its thickness.

8. The thermal ink-transfer printing apparatus according to claim 7, wherein said holding means includes a pressure roller capable of rolling on the peripheral surface of the platen roller with its axis parallel with that of the platen roller, so that the ink film passes through a gap between the pressure roller and the platen roller to be held under pressure in the direction of its thickness.

9. The thermal ink-transfer printing apparatus according to claim 8, wherein said platen roller and said pressure roller are urged toward each other.

10. The thermal ink-transfer printing apparatus according to claim 9, wherein said pressure roller is attached to the supporting means.

11. The thermal ink-transfer printing apparatus according to claim 1, further comprising a pair of pinch rollers with their axes parallel with that of the platen roller and pressed toward the platen roller from both sides thereof, wherein said recording medium passes through a gap between the pinch rollers and the platen roller so that the recording medium is moved as the platen roller rotates.

12. The thermal ink-transfer printing apparatus according to claim 1, further comprising a supply roller for the ink film, a take-up roller wound with the ink film let out from the supply roller, and guide means arranged in an ink film feeding region between the supply roller and the take-up roller to guide the ink film between the platen roller and the recording means.

13. The thermal ink-transfer printing apparatus according to claim 12, wherein said guide means includes a first guide roller disposed upstream of the preventing means with respect to the travelling direction of the ink film, and a second guide roller disposed downstream of the platen roller.

14. A thermal ink-transfer printing apparatus comprising:

recording means including a plurality of heating elements arranged in a line along an extending direction and having means for selectively generating heat in response to picture signals;

supporting means for supporting the recording means;

a rotatable platen roller having an axis parallel with said extending direction;

means for urging one of the platen roller and the supporting means toward the other so that the peripheral surface of the platen roller is urged toward contact with the heating elements of the recording means;

an ink film having an ink layer, the film overlapping a recording medium, the ink layer being positioned for passing through a gap between the platen roller and the recording means and moving along the circumference of the platen roller as the platen roller rotates while contacting said recording medium, so that the ink layer is selectively heated by the heat from the heating elements to transfer ink thereon to the recording medium; and a pair of pinch rollers arranged within a region where the ink film is subjected to thermal contraction and upstream of the recording means with respect to the travelling direction of the ink film, the axes of said pinch rollers extending parallel with said axis of the platen roller, the ink film passing through a gap between the pinch rollers to be guided in a specific path, thereby preventing the ink film from being folded transversely due to thermal contraction caused by the heat from the heating elements.

15. The thermal ink-transfer printing apparatus according to claim 14, wherein said recording means includes a thermal head.

16. The thermal ink-transfer printing apparatus according to claim 14, wherein said means for urging comprise spring urging said supporting means toward the platen roller so that the ink film and the recording medium are held under pressure between the platen roller and the recording means.

17. The thermal ink-transfer printing apparatus according to claim 14, wherein said ink film includes a base layer and an ink layer thereon.

* * * * *